(12) United States Patent
Jenkins et al.

(10) Patent No.: US 8,010,860 B2
(45) Date of Patent: Aug. 30, 2011

(54) METHOD AND ARCHITECTURE TO PREVENT CORRUPT DATA PROPAGATION FROM A PCI EXPRESS RETRY BUFFER

(75) Inventors: Peter Joel Jenkins, Colchester, VT (US); Paul Joseph Mattos, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 11/875,972

(22) Filed: Oct. 22, 2007

(65) Prior Publication Data

US 2009/0106636 A1    Apr. 23, 2009

(51) Int. Cl.
*H04L 1/14* (2006.01)
(52) U.S. Cl. .......... 714/748; 714/807; 370/394; 710/310
(58) Field of Classification Search .................. 714/748, 714/807; 370/394; 710/310
See application file for complete search history.

(56) References Cited

U.S. PATENT DOCUMENTS

| | | | |
|---|---|---|---|
| 7,152,136 B1* | 12/2006 | Charagulla | 710/315 |
| 7,191,255 B2* | 3/2007 | Wong et al. | 710/5 |
| 7,424,567 B2* | 9/2008 | Manula et al. | 710/310 |
| 7,457,897 B1* | 11/2008 | Lee et al. | 710/74 |
| 7,769,048 B2* | 8/2010 | Sharma | 370/474 |
| 7,792,014 B2* | 9/2010 | Tsang | 370/216 |

OTHER PUBLICATIONS

PCI Express Base Specification Revision 2.0; Dec. 20, 2006; PCI Express; 608 pages.
PHY Interface for the PCI Express Architecture; Version 1.00; Jun. 19, 2003 9:22 AM; PIPE Macro 1_00.doc; 2003 Inter Corporation; 31 pages.

* cited by examiner

*Primary Examiner* — Esaw T Abraham
(74) *Attorney, Agent, or Firm* — Schmeiser, Olsen & Watts; Michael J. LeStrange

(57) ABSTRACT

A PCI Express compliant method and apparatus for preventing corrupt data being transmitted from a retry buffer of a transmitting component to a receiving component over a PCI Express compliant link. The method including storing parity or electronic error correction bits for each data entry in the retry buffer along with the data itself and then comparing parity or electronic error correction bits generated from a copy of the data from the retry buffer to the parity or electronic error correction bits stored in the retry buffer. If the two sets of bits do not match, a PCI Express link between the transmitting component to a receiving component is forced down.

24 Claims, 10 Drawing Sheets

METHOD AND ARCHITECTURE TO PREVENT CORRUPT DATA PROPAGATION FROM A PCI EXPRESS RETRY BUFFER

FIELD OF THE INVENTION

The present invention relates to the field of peripheral component interconnect (PCI) architecture and methodology; more specifically, it relates to a method and architecture to prevent corrupt data propagation from a PCI Express retry buffer.

BACKGROUND OF THE INVENTION

PCI Express components must have a retry buffer for transmitted transaction layer packets (TLPs) storage to support data link layer retry. A PCI Express component may optionally support end-to-end cyclic redundancy checking (ECRC) for data integrity protection of TLPs across one or more PCI Express links. ECRC is optional because it adds latency, increases integrated circuit chip area, requires both source and destination PCI Express components to support it, and requires PCI Express specific software to enable ECRC. While the industry PCI Express Specification defines the concept of a retry buffer and when TLPs must be retired or retried from the retry buffer, the PCI Express standard does not define how to handle uncorrectable errors detected when data is read from this buffer and ECRC is not utilized. If one of the PCI Express components doesn't support ECRC and/or there is no enabling PCI Express ECRC software (both of which are common in the industry), it is possible that a PCI Express compliant component could send corrupted data from the retry buffer. Accordingly, there exists a need in the art to overcome the deficiencies and limitations described hereinabove.

SUMMARY OF THE INVENTION

A first aspect of the present invention is a method, comprising: generating a transaction layer packet in a transmitting component; storing the transaction layer packet in one or more sections in a retry buffer of the transmitting component; generating one or more check bits for each section of the transaction layer packet and storing the one or more check bits for each section of the transaction layer packet in the retry buffer; transmitting the transaction layer packet from the transmitting component to a receiving component; and upon a replay request for the transaction layer packet, in sequence from a first to a last section of the transaction layer packet: generating a copy of each section of the transaction layer packet stored in the retry buffer; generating one or more check bits for each copy of each section of the transaction layer packet; and comparing the one or more check bits for each copy of each section of the transaction layer packet with corresponding one or more check bits stored in the retry buffer for each section of the transaction layer packet; and if the one or more check bits for a copy of a particular section of the transaction layer packet match the corresponding one or more check bits stored in the retry buffer for the particular section of the transaction layer packet then transmitting the copy of the particular section of the transaction layer packet to the receiving component and if the one or more check bits for the copy of the particular section of the transaction layer packet do not match the corresponding one or more check bits for the particular section of the transaction layer packet then disabling the transmitting component to prevent the copy of the particular section transaction layer packet from being transmitted to the receiving component.

A second aspect of the present invention is a generating a transaction layer packet in a transmitting component; storing the transaction layer packet in one or more sections in a retry buffer of the transmitting component; generating one or more check bits for each section of the transaction layer packet and storing the one or more check bits for each section of the transaction layer packet in the retry buffer; in sequence from a first to a last section of the transaction layer packet: generating a first copy of each section of the transaction layer packet stored in the retry buffer; generating one or more check bits for each first copy of each section of the transaction layer packet; comparing the one or more check bits for each first copy of each section of the transaction layer packet with corresponding one or more check bits stored in the retry buffer for a corresponding section of the transaction layer packet; and if the one or more check bits for the first copy of a particular section of the transaction layer packet match the corresponding one or more check bits stored in the retry buffer for the particular section of the transaction layer packet then transmitting the first copy of the particular section of the transaction layer packet to the receiving component and if the one or more check bits for the first copy of the particular section of the transaction layer packet do not match the corresponding one or more check bits for the particular section of the transaction layer packet then disabling the transmitting component to prevent the first copy of the particular section of the transaction layer packet from being transmitted to the receiving component; and upon a replay request for the transaction layer packet, in sequence from a first to a last section of the transaction layer packet: generating a second copy of each section of the transaction layer packet stored in the retry buffer; generating one or more check bits for each second copy of each section of the transaction layer packet; comparing the one or more check bits for each second copy of each section of the transaction layer packet with corresponding one or more check bits stored in the retry buffer for a corresponding section of the transaction layer packet; and if the one or more check bits for the second copy of a particular section of the transaction layer packet match the corresponding one or more check bits stored in the retry buffer for the particular section of the transaction layer packet then transmitting the second copy of the particular section of the transaction layer packet to the receiving component and if the one or more check bits for the second copy of the particular section of the transaction layer packet do not match the corresponding one or more check bits for the particular section of the transaction layer packet then disabling the transmitting component to prevent the second copy of the particular section transaction layer packet from being transmitted to the receiving component.

A third aspect of the present invention is a method, comprising: generating a transaction layer packet in a transaction layer of a PCI Express compliant transmitting component, the transmitting component including a data link layer connected between the transaction layer and a physical layer and further including a retry buffer connected to both the transaction layer and the data link layer, the transaction layer passing the transaction layer packet to the data link layer; the data link layer storing the transaction layer packet in one or more sections in the retry buffer and the data link layer generating one or more check bits for each section of the transaction layer packet and storing the one or more check bits for each section of the transaction layer packet in the retry buffer; passing the transaction layer packet from the data link layer to the physical layer of the transmitting component; transmitting the transaction layer packet from the physical layer of the transmitting component to a physical layer of a PCI Express compliant receiving component over a PCI Express compliant link; and upon a replay request for the transaction layer packet in sequence from a first to a last section of the transaction layer packet and in the data link layer: generating a copy of each section of the transaction layer packet stored in the retry buffer; generating one or more check bits for each copy of each section of the transaction layer packet, comparing the one or more check bits for each copy of each section of the transaction layer packet with corresponding one or more check bits stored in the retry buffer for each section of the transaction layer packet, and passing each copy of each section of the transaction layer packet to the physical layer of the transmitting component; and if the one or more check bits for a copy of a particular section of the transaction layer packet match the corresponding one or more check bits stored in the retry buffer for the particular section of the transaction layer packet then transmitting the copy of the particular section of the transaction layer packet from the physical layer of the transmitting component to the physical layer of the receiving component over the PCI Express link and if the one or more check bits for the copy of the particular section of the transaction layer packet do not match the corresponding one or more check bits for the particular section of the transaction layer packet then disabling a transmitting capability of the physical layer of the transmitting component to prevent the copy of the particular section transaction layer packet from being transmitted to the physical layer of the receiving component.

A fourth aspect of the present invention is a method, comprising: generating a transaction layer packet in a transaction layer of a PCI Express transmitting component, the transmitting component comprised of the transaction layer, a data link layer, a physical layer and a retry buffer, the data link layer connected between the transaction layer and the physical layer and the retry buffer connected to the data link layer, the transaction layer storing the transaction layer packet in one or more sections in the retry buffer and generating one or more check bits for each section of the transaction layer packet and storing the one or more check bits for each section of the transaction layer packet in the retry buffer; in sequence from a first to a last section of the transaction layer packet and in the data link layer: generating a first copy of each section of the transaction layer packet stored in the retry buffer; generating one or more check bits for each first copy of each section of the transaction layer packet; comparing the one or more check bits for each first copy of each section of the transaction layer packet with corresponding one or more check bits stored in the retry buffer for a corresponding section of the transaction layer packet and passing each first copy of each section of transaction layer packet to the physical layer of the transmitting component; and if the one or more check bits for a particular section of the first copy of transaction layer packet match the corresponding one or more check bits stored in the retry buffer for the particular section of the transaction layer packet then transmitting the first copy of the particular section of the transaction layer packet from the physical layer of the transmitting component to a physical layer of a receiving component and if the one or more check bits for the first copy of the particular section of the transaction layer packet do not match the corresponding one or more check bits for the particular section of the transaction layer packet then disabling the physical layer of the transmitting component to prevent the first copy of the particular section transaction layer packet from being transmitted to from the physical layer of the transmitting component to the physical layer of the receiving component; and upon a replay request for the transaction layer packet, in sequence from a first to a last section of the transaction layer packet and in the data link layer: generating a second copy of each section of the transaction layer packet stored in the retry buffer; generating one or more check bits for each second copy of each section of the transaction layer packet; comparing the one or more check bits for each second copy of each section of the transaction layer packet with corresponding one or more check bits stored in the retry buffer for a corresponding section of the transaction layer packet and passing each second copy of each section of transaction layer packet to the physical layer of the transmitting component; and if the one or more check bits for a particular section of the second copy of transaction layer packet match the corresponding one or more check bits stored in the retry buffer for the particular section of the transaction layer packet then transmitting the second copy of the particular section of the transaction layer packet from the physical layer of the transmitting component to a physical layer of a receiving component and if the one or more check bits for the second copy of the particular section of the transaction layer packet do not match the corresponding one or more check bits for the particular section of the transaction layer packet then disabling a transmitting capability of the physical layer of the transmitting component to prevent the second copy of the particular section transaction layer packet from being transmitted from the physical layer of the transmitting component to the physical layer of the receiving component.

A fifth aspect of the present invention is a PCI Express component, comprising: a PCI Express compliant transaction layer, a PCI Express compliant data link layer, a PCI Express compliant physical layer, a PCI Express compliant retry buffer, and a parity/error check and correction circuit, the transaction layer connected to the retry buffer by a first transmit bus and to the data link layer by a first receive bus, the data link layer connected to the physical layer by a second transmit bus and a second receive bus, the retry buffer connected to the data link layer by a third transmit bus; the parity/error check and correction circuit coupled to both the retry buffer and the physical layer; wherein the transaction layer is configured to generate a transaction layer packet and write the transaction layer packet in one or more sections to the retry buffer and to generate a set of one or more check bits for each of the one or more sections of the transaction layer packet and write the sets of one or more check bits to the retry buffer; wherein the retry buffer is configured to store the one or more transaction layer packet sections and the set of one or more check bits; wherein the parity/error check and correction circuit is configured to generate a copy of a particular section of the one or more transaction layer sections and a copy of the corresponding set of one or more check bits for the particular section of the one or more transaction layer sections, pass the copy of the particular section of the one or more transaction layer sections to the physical layer, generate a new set of one or more check bits based on the copy of the particular section of the one or more transaction layer sections, compare the copy of the corresponding set of one or more check bits with the new set of one or more check bits and disable a transmission capability of the physical layer if the copy of the corresponding set of one or more check bits does not match the new set of one or more check bits; and the physical layer connectable to a PCI Express link by a fourth transmit bus and a third receive bus.

A sixth aspect of the present invention is A PCI Express component, comprising: a PCI Express compliant transaction layer, a PCI Express compliant data link layer, a PCI Express compliant physical layer, a PCI Express compliant retry buffer, and a parity/error check and correction circuit, the transaction layer connected to the data link layer by a first transmit bus and a first receive bus, the data link layer connected to the physical layer by a second transmit bus and a second receive bus, the retry buffer connected to the data link layer by a third transmit bus and a fourth receive bus; the parity/error check and correction circuit coupled to the retry buffer, the data link layer and the physical layer; wherein the transaction layer is configured to generate a transaction layer packet and pass the transaction layer packet to the data link layer; wherein the data link layer is configured to pass the transaction layer packet to the physical layer and to store, in the retry buffer, a copy of the transaction layer packet in one or more sections; wherein the parity/error check and correction circuit is configured to generate respective sets of one or more check bits for each of the one or more sections and store the sets of one or more check bits in the retry buffer; wherein the data link layer is configured to read the retry buffer and to pass a copy of each section of the one or more transaction layer packet sections from the retry buffer to the physical layer upon a receiving a replay request; wherein, the parity/error check and correction circuit is configured to read each set of one or more check bits for each copy of each section of the one or more transaction layer packet section and generate a new respective set of one or more check bits based on the copies of each section of the one or more transaction layer packet sections read from the retry buffer, compare the set of one or more check bits read from the retry buffer with the new set of one or more check bits and disable a transmission capability of the physical layer if any set of the one or more check bits read from the retry buffer does not match a corresponding new set of one or more check bits; and the physical layer connectable to a PCI Express link by a fourth transmit bus and a fourth receive bus.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
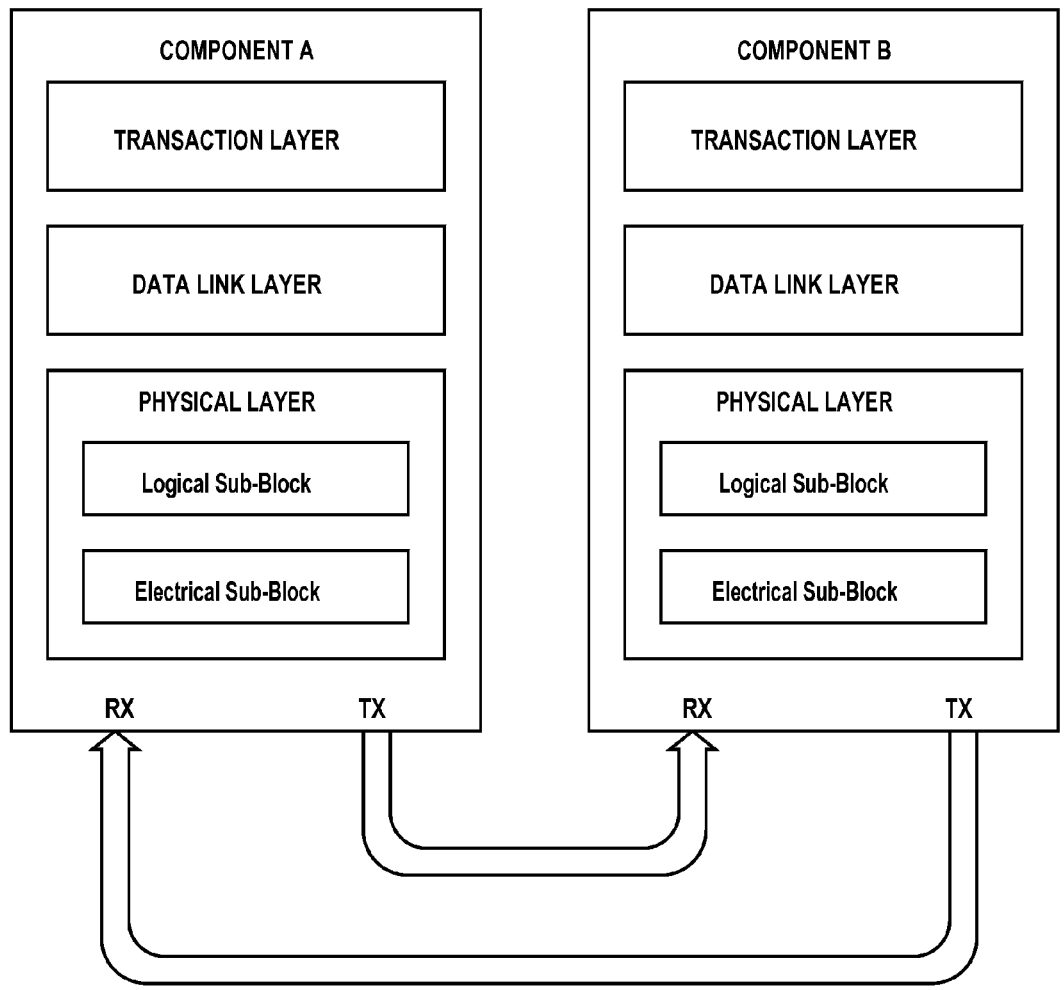
FIG. 1, is a diagram of two components connected by PCI Express Protocol.

FIG. 1 is a diagram of two components connected by PCI Express Protocol. PCI Express (also known as PCIe) is a layered communication protocol consisting of a transaction layer, a data link layer and a physical layer. The physical layer is further subdivided into a logical sub-layer and an electrical sub-layer. PCI Express based on dual-simplex communication channels between two components. The fundamental PCI Express link consists of a pair of low-voltage, unidirectional and differentially driven signal pairs (also known as lanes) with one pair designated for transmitter (TX) functions and the other pair designated for receiver (RX) functions.

Figure 2:
FIG. 2, is a diagram of the construction of transaction layer packets according to the PCI Express protocol.

FIG. 2 is a diagram of the construction of transaction layer packets according to the PCI Express protocol. PCI Express uses packets to communicate information between components. Packets are formed in the transaction layer and comprise a header, and optionally data and optionally ECRC check code. In the data link layer a sequence number is appended before the header and a link cyclic redundancy check code (LCRC) is added to the end of the packet. In the physical layer, framing is added before the sequence number and after the LCRC code.

PCI Express is described in detail in the PCI Express Base Specification, Revision 2.0 Dec. 20, 2007 and in the PHY Interface for the PCI Express Architecture (PIPE), Version 1.00, Jun. 19, 2003 both of which are hereby incorporated by reference.

Figure 3:
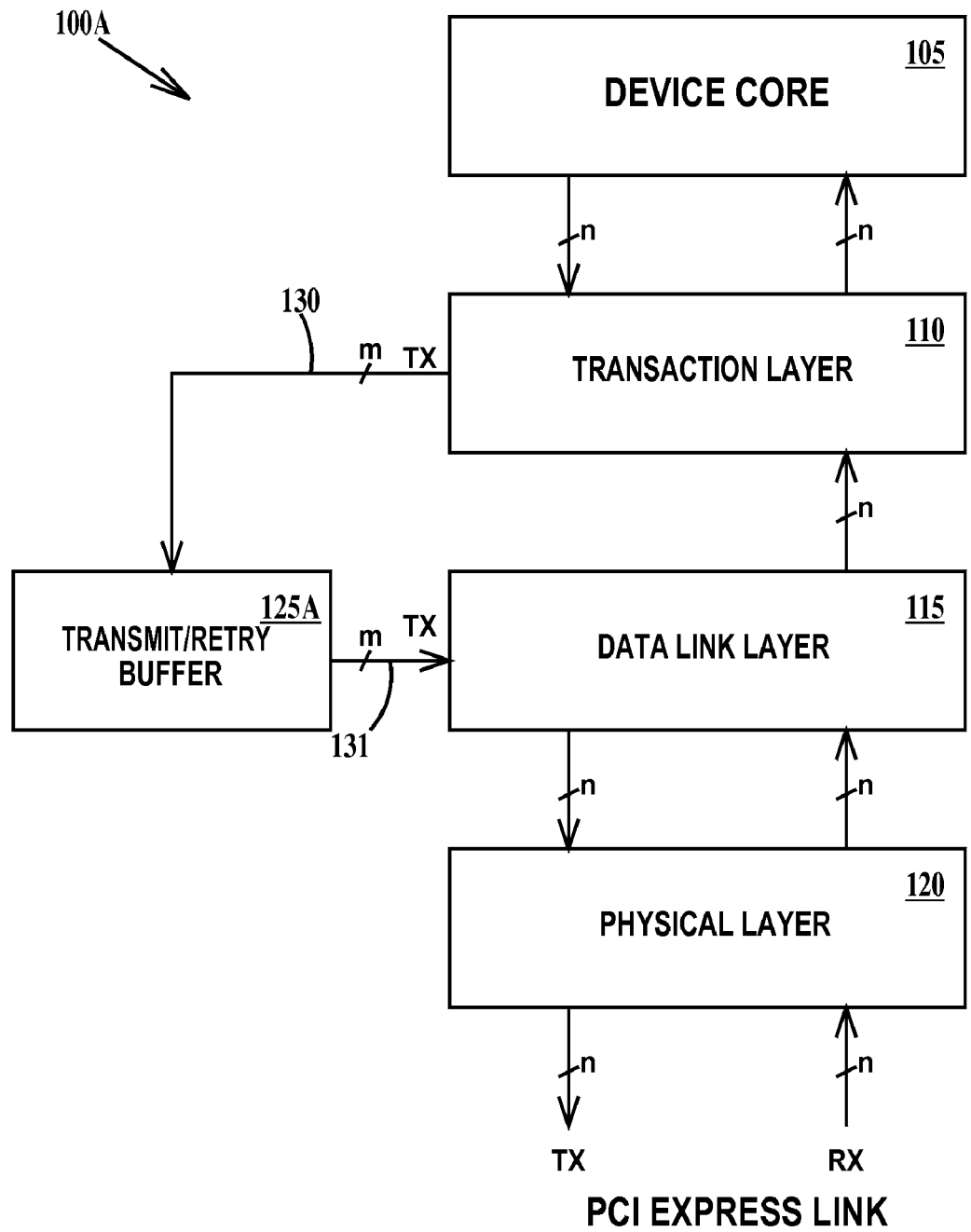
FIG. 3 is diagram illustrating a first method of interconnection of a retry buffer within the PCI Express protocol.

FIG. 3 is diagram illustrating a first method of interconnection of a retry buffer within the PCI Express protocol. In FIG. 3, a PCI Express component 100A includes a device core 105, a transaction layer 110, a data link layer 115, a physical link layer 120 and a transmit/retry buffer 125A. Device core 105 represents a system function that is to be linked to another system function through the PCI Express link.

Device core 105 is connected to transaction layer 110 by n transmit lanes TX and n receive lanes RX. Each lane consists of a differential wire pair. The PCI Express specification supports values of n=1, 2, 4, 8, 12, 16 and 32. The number of physical wires (the data bus width) in a link will vary depending upon implementation. Lanes in a link transmit data in parallel. Each parallel data path in is clocked at a certain frequency to keep up with the link data rate. For a x8 link with a link data rate of 2.5 GT/s (giga-transactions/sec), a 64-bit data bus would need to be clocked at 250 MHz. However, the data width could be doubled to 128 bits while the clock is halved to 125 MHz. In a second example, for a link data rate of 5.0 GT/s, a 64-bit data bus would need to be clocked at 500 MHz in order to keep up with the link data rate. Device core 105 is implemented in hardware.

Transaction layer 110 is connected to data link transmit/retry buffer 125A by an m-byte input bus 130 and to data link layer 115 by n receive lanes RX. Transmit/retry buffer 125A is connected to data link layer 115 by an m-byte output bus 131. While m may be less than n, it is more likely that m will be equal to n. The responsibility of transaction layer 110 is the assembly of TLPs for transmission and disassembly of received TLPs. Transaction layer 110 is implemented in hardware.

Data link layer 115 is connected to physical layer 120 by n transmit lanes and n receive lanes. The responsibility of data link layer 115 is PCI Express link management and data integrity, including error detection and error correction. For example, it is the data link layer that adds the CRC to TLPs being transmitted and reads the LCRC of received TLPs. Data link layer 115 also generates and consumes data link layer packets (DLLPs) that are used for PCI Express link management for both receive and transmit functions. Data link layer 115 is implemented in hardware.

Physical layer 120 is connected to the PCI Express link (for example a socket on a motherboard or printed circuit board edge connector) by n transmit lanes and n receive lanes. The responsibility of physical layer 120 is to convert information received from data link layer 115 into an appropriate serialized format and to transmit that information across the PCI Express link at the supported PCI Express data rate.

Physical layer 120 comprises a logical sub-block having receiver and transmitter sections and an electrical sub-block. The logical sub-block directs control and management functions of physical layer 120. The electrical sub-block includes all circuitry for interface operation, including driver and input buffers, parallel-to-serial and serial-to-parallel conversions, clocking and impedance matching circuits. Physical layer 120 is implemented in hardware.

When a TLP is transmitted, the TLP is passed from transaction layer 110 via input bus 130 to transmit/retry buffer 125A where a copy of the TLP is stored and then the TLP is passed to data link layer 115 via output bus 131 of the transmitting component. An LCRC check and a sequence number check are performed in data link layer 115 of the receiving component for the TLP when the TLP is received in the receiving components data link layer 115. If a TLP passes the LCRC and sequence number checks, then an acknowledgement (ACK) is sent to the transmitting components data link layer 115 and the copy of the TLP is removed from transmit/retry buffer 125A of the transmitting component. If an error occurs during transmission of a TLP a negative acknowledgement (NAK) is sent by the receiving component to the transmitting component. For example, if a TLP fails the LCRC and/or sequence number checks then a NAK is sent and a copy the TLP stored in transmit/retry buffer 125A is resent (replayed) via output bus 131 and data link layer 115 of the transmitting component. The copy of the stored TLP can also be sent after a timeout waiting for an ACK. ACK and NAK signals are transmitted using DLLPs. Since the LCRC data integrity check is the primary check performed on the received TLP by the data link layer 115 of the receiving component, if the TLP stored in transmit/retry buffer 125A is corrupt, upon a resend, a corrupt copy of TLP will be transmitted.

Figure 4:
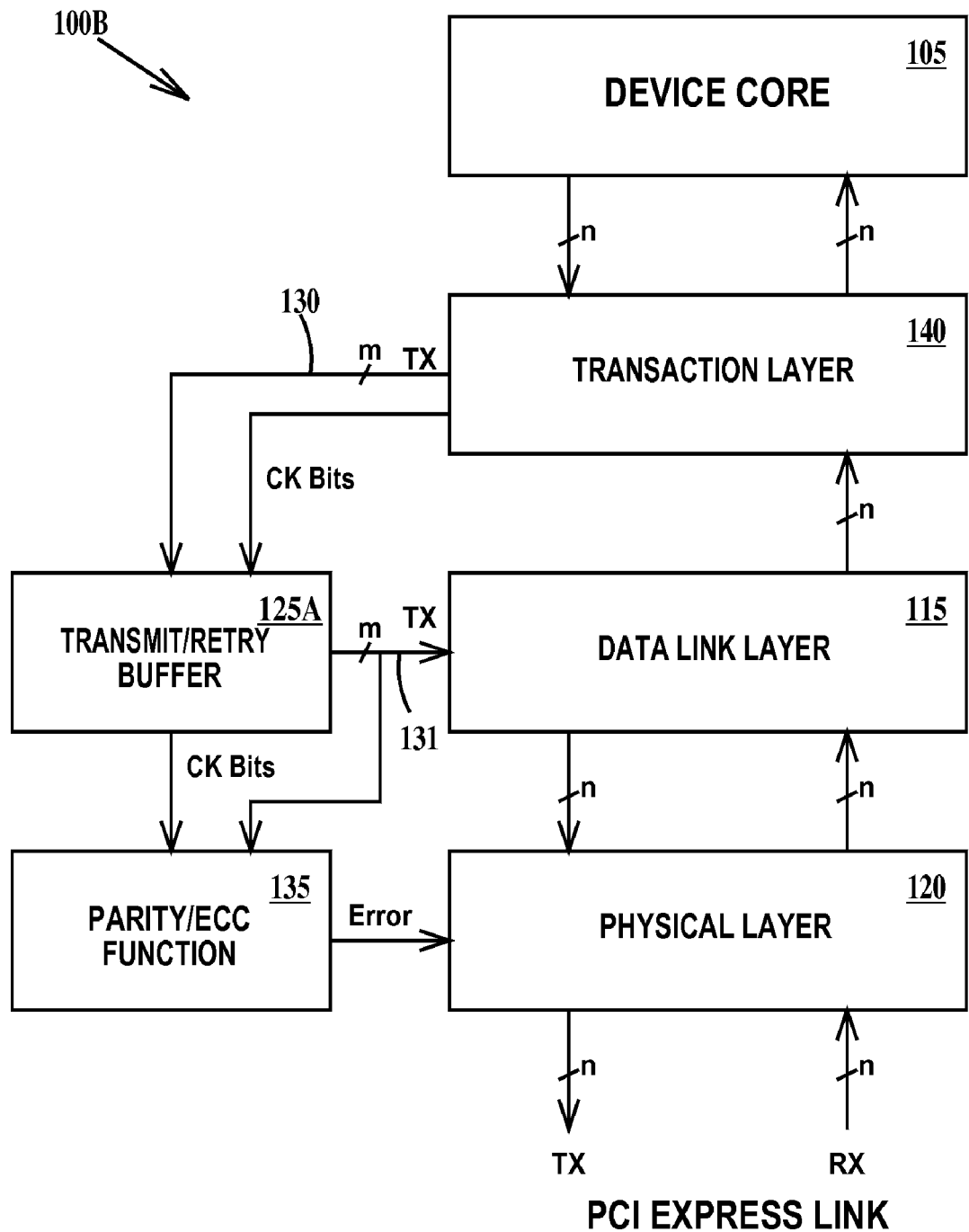
FIG. 4 is diagram illustrating a PCI Express retry buffer architecture according to a first embodiment of the present invention as applied to the first method of interconnection illustrated in FIG. 3.

FIG. 4 is diagram illustrating a PCI Express retry buffer architecture according to a first embodiment of the present invention as applied to the first method of interconnection illustrated in FIG. 3. In FIG. 4, a PCI Express component 100B is similar to PCI Express component 100A of FIG. 3, except a parity/error check and correction (ECC) function 135 has been added and a transaction layer 140 replaces transaction layer 110 of FIG. 3. Transaction layer 140 is similar to transaction layer 110 of FIG. 3 except check bits (CK bits) are generated for each TLP that is written into transmit/retry buffer 125A. The CK bits are associated with the corresponding TLP and also stored in transmit/retry buffer 125A.

When a replay is required, a copy of the TLP in transmit/retry buffer 125A is sent to both data link layer 115 via output bus 131 and to parity/ECC function 135. A copy of the associated CK bit(s) that are stored in transmit/retry buffer 125A are also sent to parity/ECC function 135. In parity/ECC function 135 a parity or ECC (depending on the type of CK bit implemented) check is performed on the copy of the TLP.

In one example, the CK bits are a single bit per byte. There are several parity bit schemes available including even and odd parity. In one example, a parity bit is a binary digit that indicates whether the number of bits with a value of one in a given set of bits is even or odd. A new set of parity bits is generated from the copy of TLP and compared to the CK bits. If an odd number of bits have changed in the copy then the new parity bit and the CK bit will not match and parity/ECC function 135 generates an error signal sent to physical layer 120. However, if an even number of bits have changed, then the new parity bit will match the CK bit. However, implementation of parity bit checking is very simple.

In another example, the CK bits are ECC bits. There are many types of ECC schemes, but they all share the feature that they can detect more bit errors than they can correct. Though it is possible to correct a corrupt TLP using ECC, the present invention uses ECC only to detect errors in the TLP and not correct those errors. Thus, an ECC methodology that corrects one and detects two bits would be satisfactory for the present invention, however the invention is not limited to detect two bits, correct one-bit ECC methodologies. Both parity and ECC may be used at the same time, so the CK bits may be a combination of both a parity bit and a number of CK bits.

Figure 10:
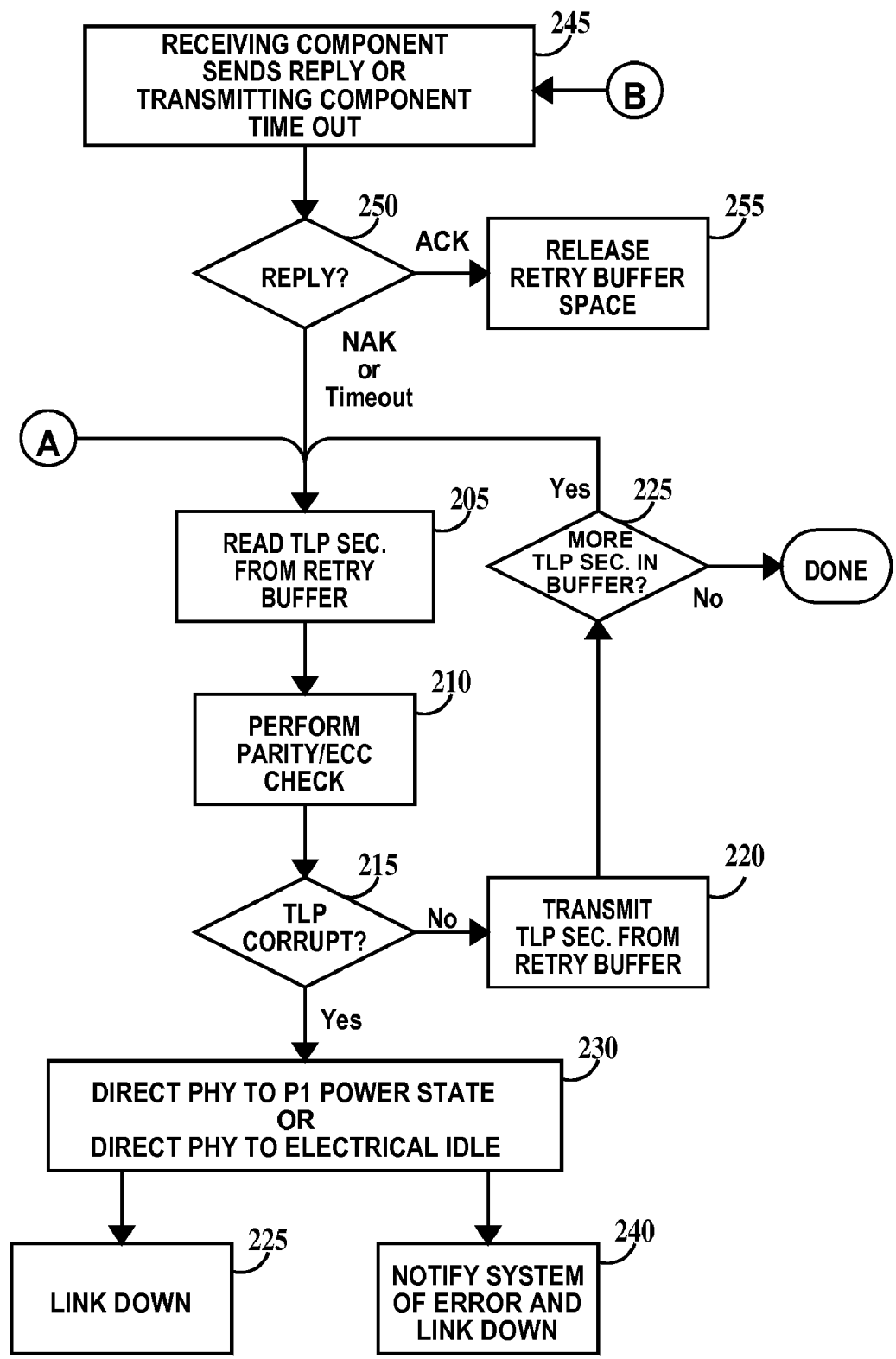

If the copy passes the parity/ECC check, the copy is allowed to be transmitted from physical layer 120. If the copy fails the parity/ECC check, then an error signal is generated by parity/ECC function 135 and sent to physical layer 120. The error signal causes physical layer 120 to transition, for example, to an electrical idle state or P1 power state, thus preventing physical layer 120 sending the copy of the TLP. Electrical idle is a state where the physical layer drives each line of every differential pair to a same DC voltage level and no data can be transmitted. In the P1 power state, selected internal clocks in physical layer 120 are turned off, but the main clock (PCLK) remains on. When physical layer 120 goes into an expected electrical idle or the P1 power state, the PCI Express link is effectively "shut down", all information in transmit/retry buffer 125A is subsequently lost, thus preventing corrupt TLPs (or TLP sections, as described infra) from being sent even after power up of the PCI Express link. The "shutting down" of the PCI Express link is illustrated in FIG. 10 and described infra. It should also be noted that, except for the relatively minor changes of generating and storing parity/ECC check bits in transmit/retry buffer 125A and reading those bits when a copy of the TLP is read from the retry buffer, the "normal" operation of the transaction layer, data link layer and physical layer of the PCI Express protocol is undisturbed.

In order not have to have an overly wide retry buffer, the header, data and ECRC portions (see FIG. 2) of a transaction layer packet are stored in sections and transmitted in sections. Since any section of any TLP may be corrupt, there will be CK bits associated with each TLP section. Therefore, transmission of a TLP may require a sequence of TLP section reads and parity/ECC checks rather than just a single read and parity/ECC check. For sufficiently large TLPs, it is possible that a section of a TLP is being transmitted while the next consecutive TLP section is being retrieved from transmit/retry buffer 125A. It should also be noted, the transmit/retry buffer 125A may contain more than one TLP at any given time.

Figure 5:
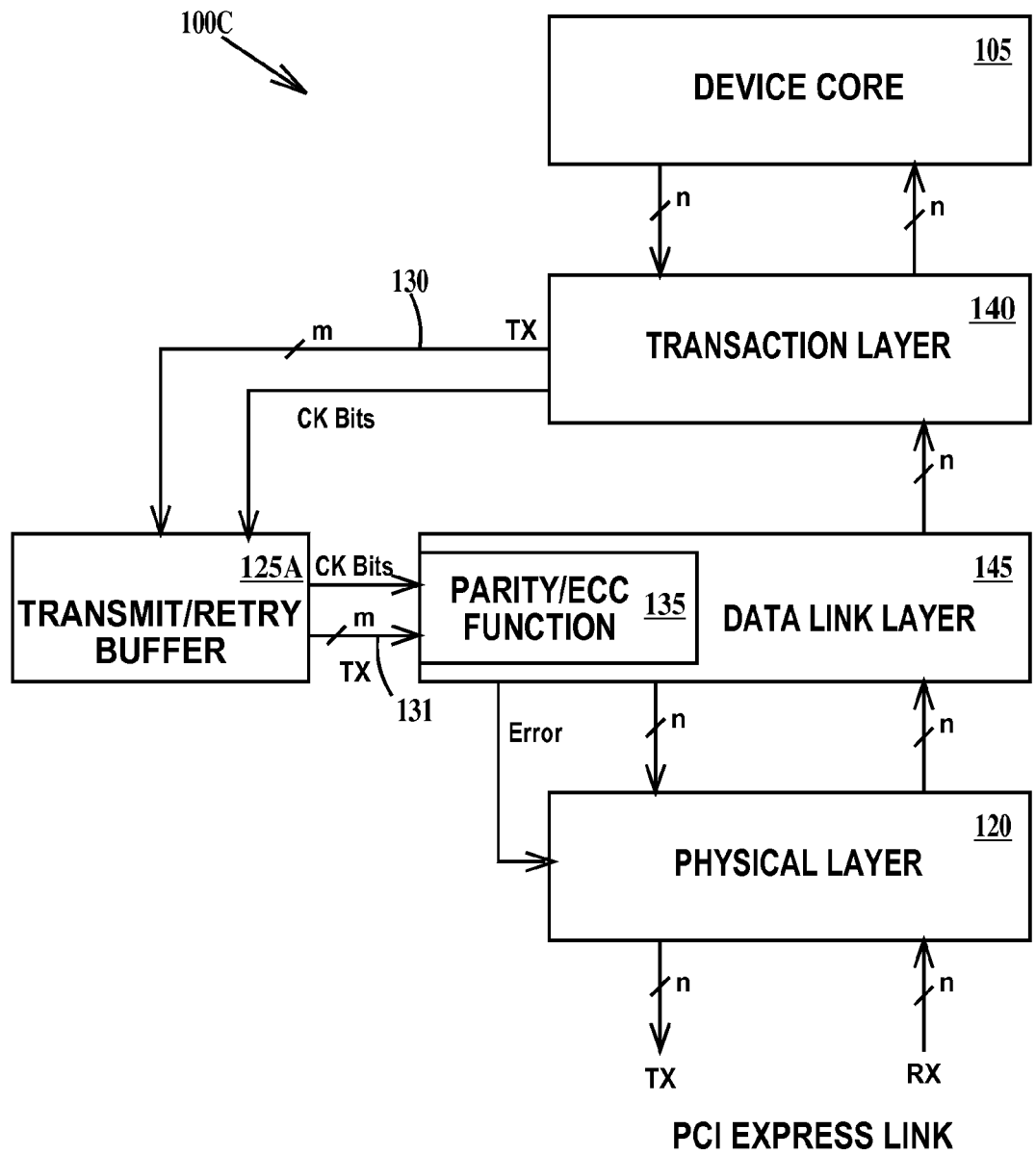
FIG. 5 is diagram illustrating a PCI Express retry buffer architecture according to a second embodiment of the present invention as applied to the first method of interconnection illustrated in FIG. 3.

FIG. 5 is diagram illustrating a PCI Express retry buffer architecture according to a second embodiment of the present invention as applied to the first method of interconnection illustrated in FIG. 3. In FIG. 5, a PCI Express component 100C is similar to PCI Express component 100B of FIG. 4, except a data link layer 145 replaces data link layer 115 of FIG. 4 and parity/ECC function 135 has been added directly into the data link layer. Again, check bits are generated in transaction layer 110 and stored in transmit/retry buffer 125A along with the TLP (or each TLP section).

When a replay is required, a copy of the TLP (or TLP section) in transmit/retry buffer 125A along with its associated CK bits is sent to data parity/ECC function 135 of data link layer 145. In parity/ECC function 135 a parity or ECC (depending on the type of CK bit implemented) check is performed on the copy of the TLP (or TLP section). If the copy passes the parity/ECC check, the copy is allowed to be transmitted from data link layer 145 to physical layer 120. If the copy fails the parity/ECC check, then an error signal is generated by parity/ECC function 135 and sent to physical layer 120. The error signal causes physical layer 120 to transition to, for example, electrical idle or the P1 power state. When physical layer 120 goes into an unexpected electrical idle or the P1 power state, the PCI Express link is effectively "shut down", all information in transmit/retry buffer 125A is subsequently lost and, thus preventing corrupt TLPs (or TLP sections) from being sent even after power up of the PCI Express link.

It should be noted, that all transmissions of TLPs (or TLP sections) including the initial transmission are subject to parity/ECC checking in the first and second embodiment (FIGS. 4 and 5) of the present invention.

Figure 6:
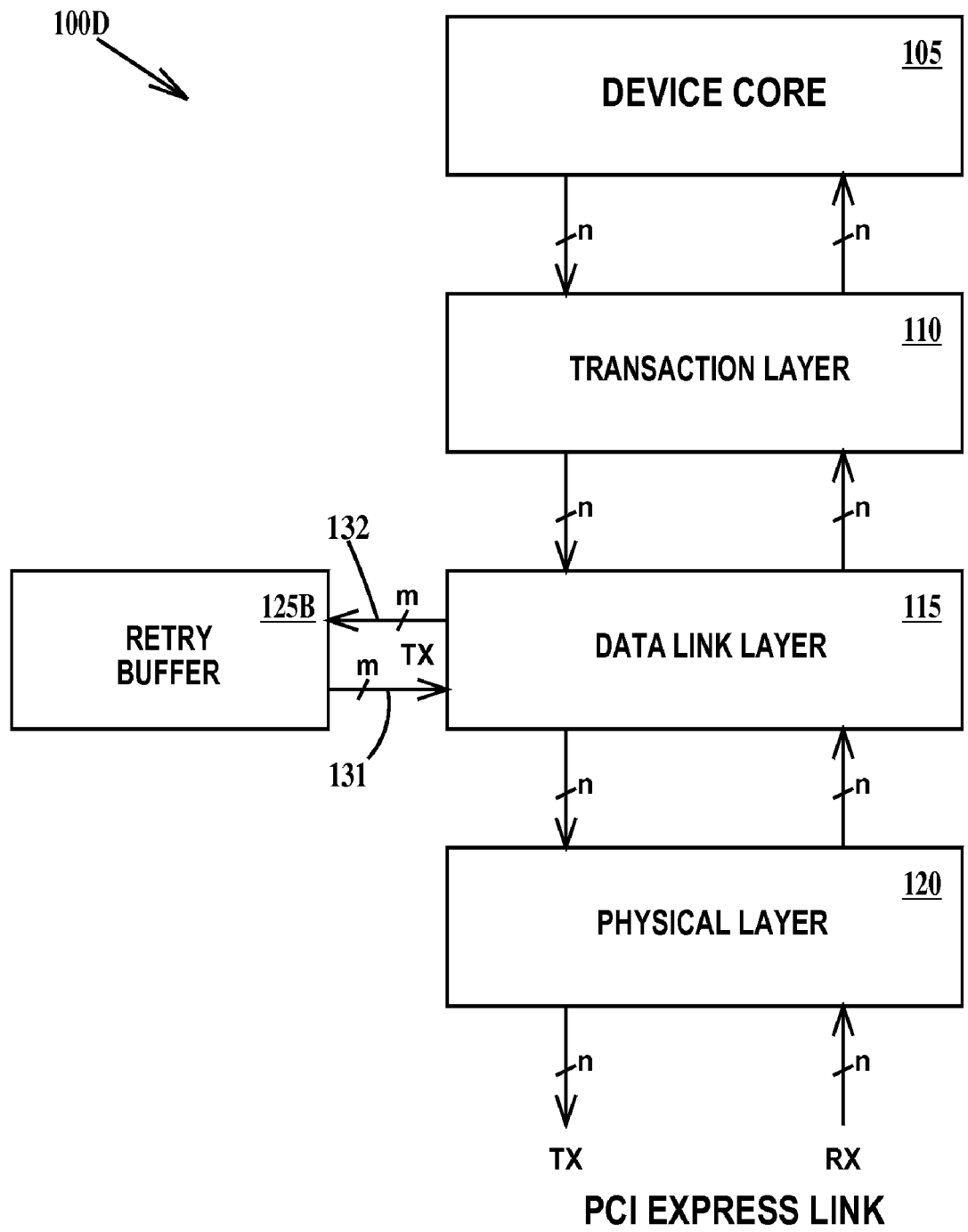
FIG. 6 is diagram illustrating a second method of interconnection of a retry buffer within the PCI Express protocol.

FIG. 6 is diagram illustrating a second method of interconnection of a retry buffer within the PCI Express protocol. In FIG. 6, a PCI Express component 100D is similar to PCI Express component 100A of FIG. 3, except a retry buffer 125B replaces transmit/retry buffer 125B, transaction layer 110 is connected to data link layer by a n TX lanes and data link layer 115 is connected to retry buffer by an m-byte input bus 132 as well as output bus 131. Thus when a TLP (or TLP section) is passed through data link 115 for transmission, a copy is stored in retry buffer 125B via input bus 132. The stored TLP (or TLP section) can be replayed via output bus 131.

Figure 7:
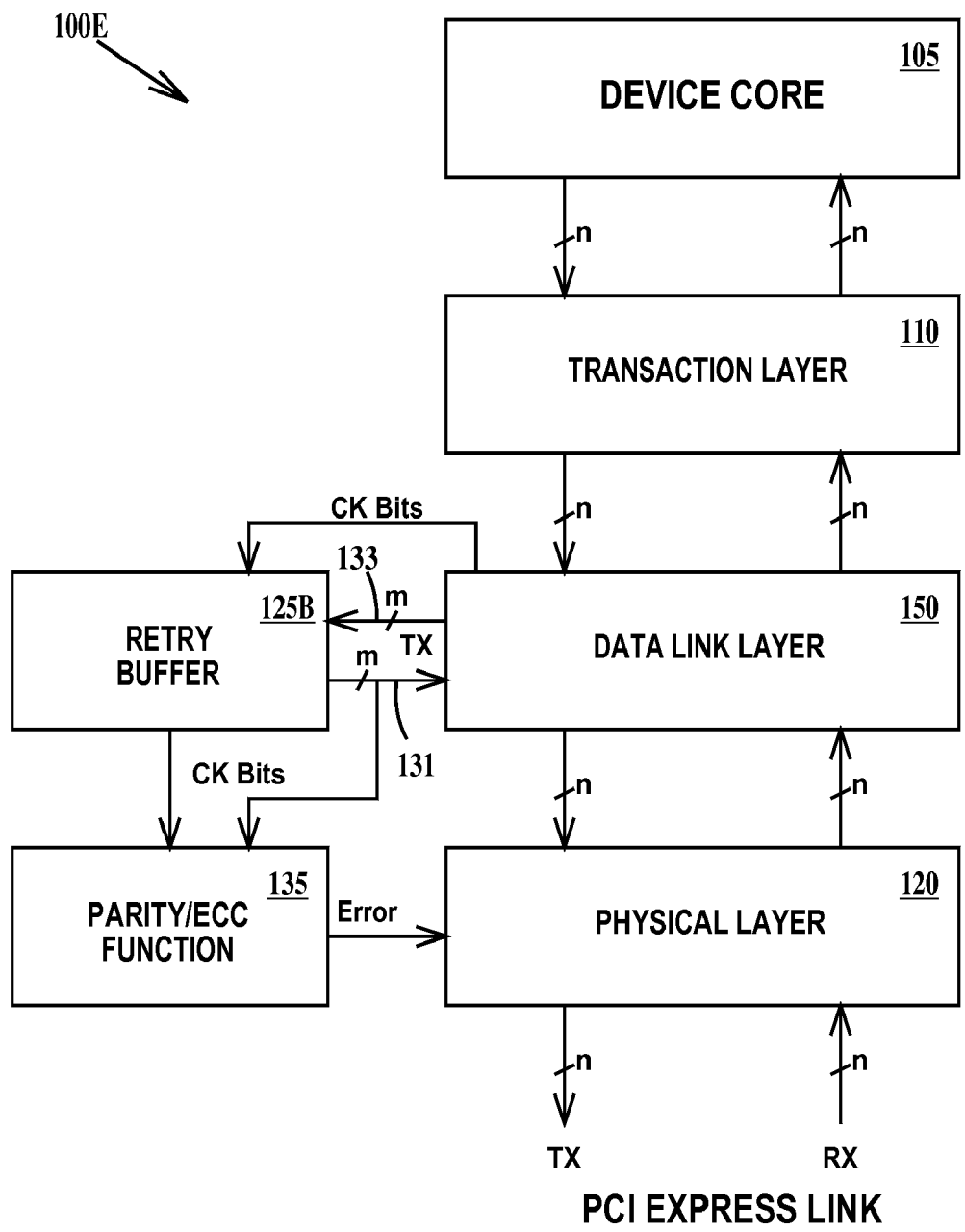
FIG. 7 is diagram illustrating a PCI Express retry buffer architecture according to a third embodiment of the present invention as applied to the second method of interconnection illustrated in FIG. 6.

FIG. 7 is diagram illustrating a PCI Express retry buffer architecture according to a third embodiment of the present invention as applied to the second method of interconnection illustrated in FIG. 6. In FIG. 7, a PCI Express component 100E is similar to PCI Express component 100D of FIG. 5, except a parity/ECC function 135 has been added and a data link layer 150 replaces data link layer 115 of FIG. 6. Data link layer 150 is similar to data link layer 115 of FIG. 6 except check bits (CK bits) are generated for each TLP (or TLP section) that is written into retry buffer 125B. The CK bits are associated with the corresponding TLP (or TLP section) and also stored in retry buffer 125B.

When a replay is required, a copy of the TLP (or TLP section) in retry buffer 125B is sent to both data link layer 150 via output bus 131 and to parity/ECC function 135. A copy of the associated CK bit(s) that are stored in retry buffer 125B are also sent to parity/ECC function 135. In parity/ECC function 135 a parity or ECC (depending on the type of CK bit implemented) check is performed on the copy of the TLP (or TLP section).

If the copy passes the parity/ECC check, the copy is allowed to be transmitted from physical layer 120 to the receiving component. If the copy fails the parity/ECC check, then an error signal is generated by parity/ECC function 135 and sent to physical layer 120. The error signal causes physical layer 120 to transition, for example, to electrical idle or the P1 power state. When physical layer 120 goes into electrical idle or the P1 power state, the PCI Express link is effectively "shut down", all information in retry buffer 125B is subsequently lost and, thus preventing corrupt TLPs (or TLP sections) from being sent even after power up of the PCI Express link. The shutting down of the PCI Express link is illustrated in FIG. 10 and described infra. It should also be noted that, except for the relatively minor changes of generating and storing parity/ECC check bits in retry buffer 125B and reading those bits when a copy of the TLP (or TLP section) is read from the retry buffer, the "normal" operation of the transaction layer, data link layer and physical layer of the PCI Express protocol is undisturbed.

Figure 8:
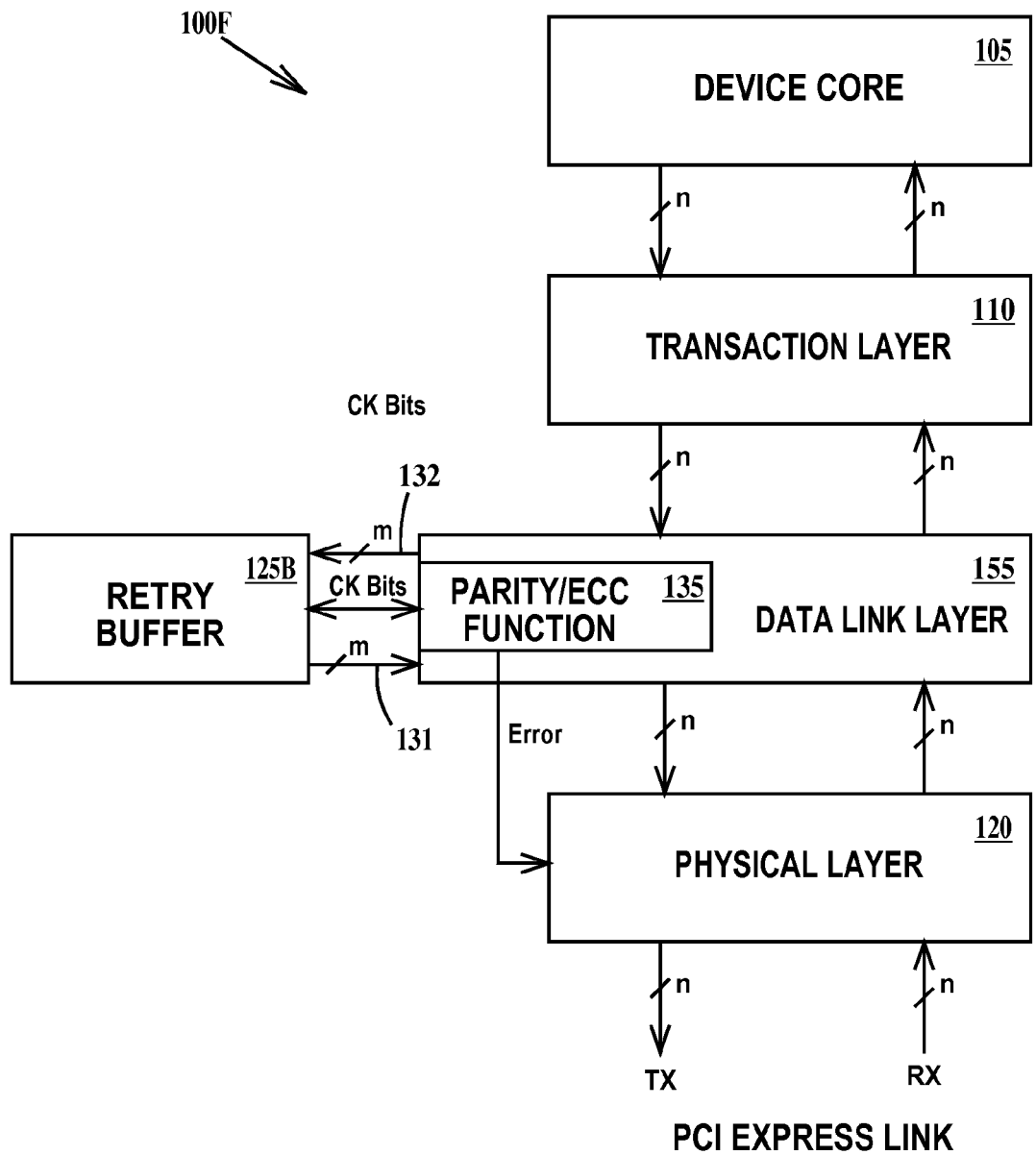
FIG. 8 is diagram illustrating a PCI Express retry buffer architecture according to a fourth embodiment of the present invention as applied to the second method of interconnection illustrated in FIG. 6.

FIG. 8 is diagram illustrating a PCI Express retry buffer architecture according to a fourth embodiment of the present invention as applied to the second method of interconnection illustrated in FIG. 6. In FIG. 8, a PCI Express component 100F is similar to PCI Express component 100E of FIG. 7, except a data link layer 155 replaces data link layer 150 of FIG. 7 and parity/ECC function 135 has been added directly into the data link layer. Again, check bits are generated in data link layer 150 and stored in retry buffer 125B along with the TLP (or TLP sections).

When a replay is required, a copy of the TLP in retry buffer 125B along with its associated CK bits is sent to data parity/ECC function 135 of data link layer 155. In parity/ECC function 135 a parity or ECC (depending on the type of CK bit implemented) check is performed on the copy of the TLP. If the copy passes the parity/ECC check, the copy is allowed to be transmitted from data link layer 155 to physical layer 120. If the copy fails the parity/ECC check, then an error signal is generated by parity/ECC function 135 and sent to physical layer 120. The error signal causes the PCI Express Link to transition, for example, to electrical idle or the P1 power state. When physical layer 120 goes into electrical idle or the P1 power state, the PCI Express link is effectively "shut down", all information in retry buffer 125B is subsequently lost and, thus preventing corrupt TLPs (or TLP sections) from being sent even after power up of the PCI Express link.

It should be noted, that all transmissions of TLPs (or TLP sections) except the initial transmission are subject to parity/ECC checking in the third and fourth embodiments (FIGS. 7 and 8) of the present invention.

Figure 9:
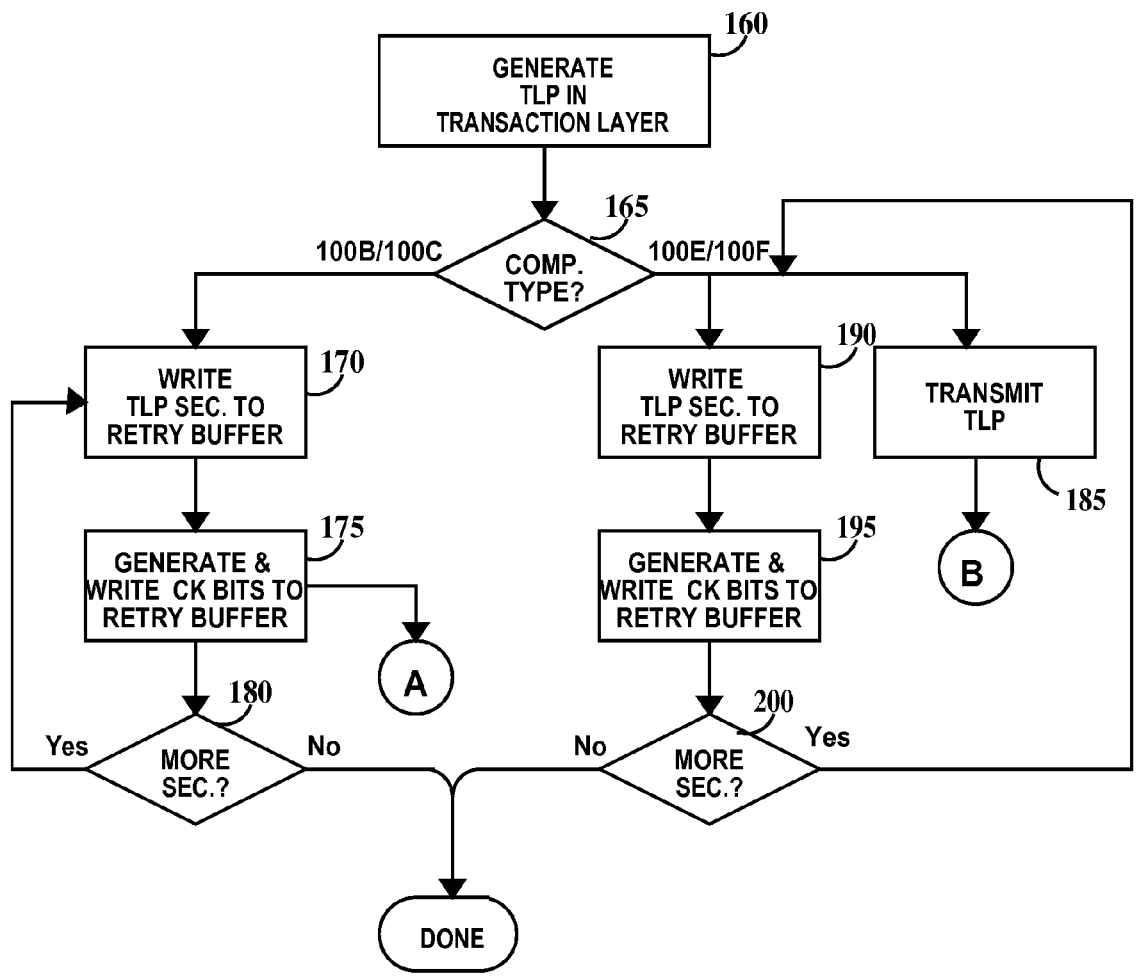
FIGS. 9 and 10 are flowcharts of a method for preventing propagation of corrupt data from a PCI Express retry buffer according to the present invention.

FIGS. 9 and 10 are flowcharts of a method for preventing propagation of corrupt data from a PCI Express retry buffer according to the present invention. In FIG. 9, step 160, a current TLP is generated in the transaction layer of a sending PCI Express component. In step 165, if the transmitting PCI Express component is 100B of FIG. 4 or 100C of FIG. 5, the method proceeds to step 170. In step 170, TLP data (either the entire current TLP or sections of the current TLP if it exceeds the width of the input bus of the retry buffer) are written to the retry buffer and in step 175, CK bits (as described supra) are generated for the TLP or TLP section and stored in the retry buffer. The method branches to FIG. 10 via connector A and to step 180. Next, in step 180, it is determined if more TLP data (TLP sections) exist. If more TLP sections exist, then method loops to step 170 where the next consecutive TLP section of the current TLP is processed. If no more TLP sections exist then the method terminates for the current TLP as far as writing the current TLP and CK bits to the retry buffer.

Returning to FIG. 9, if the transmitting PCI Express component is 100E of FIG. 7 or 100F of FIG. 8, the method branches to step 185 and to step 190. In step 185, the TLP is transmitted (for the first time) to the receiving component and then the method proceeds to step 245 of FIG. 10 via connector B. Returning to step 190, in step 190, TLP data (either the entire current TLP or sections of the current TLP if it exceeds the width of the input bus of the retry buffer) are written to the retry buffer and in step 195, CK bits (as described supra) are generated for the TLP or TLP section and stored in the retry buffer. Next, in step 200, it is determined if more TLP data (TLP sections) exist. If more TLP sections exist, then method loops step 190 where the next consecutive TLP section of the current TLP is processed. If no more TLP sections exist then the method terminates for the current TLP as far as writing the current TLP and CK bits to the retry buffer.

In FIG. 10, step 205, a TLP or TLP section is read from retry buffer 205. Entry to step 205 is via connector A from FIG. 9 or from step 250 of a reply sequence described infra.

In step 210, a copy of the TLP stored in retry buffer and its associated CK bits are read out of the retry and in step 210 a parity/ECC check is performed on the CK bits. In step 215 it is determined if the TLP (or TLP section) copy is corrupt using CK bits. If the TLP copy (or TLP section) is not corrupt, then in step 220 the TLP (or TLP section) copy is transmitted to the receiving component and via the physical layer and in step 225 it is determined if there are more TLP sections for the current TLP. If there are more TLP sections, the method loops back to step 205, otherwise the method is complete for the current TLP.

Returning to step 215, if the TLP copy is determined to be corrupted, then the method proceeds to step 230. In step 230, either the physical layer of the transmitting component is directed from a normal operational power state (the P0 power state) to a lower power state (for example its P1 power state) or directed to its electrical idle state. In either case, in step 235 the PCI Express link will go down and the corrupted TLP will not be transmitted. Optionally, in step 240, the system is notified of the error and the link down condition.

Returning to the reply loop, in step, 245 either the data link layer of the receiving PCI Express component sends a reply for the TLP to the data link layer of the transmitting PCI Express component or the transmitting data link layer times out awaiting the reply. Next, in step 250, if an ACK is received the method proceeds to step 255 where the storage used by the TLP and its associated CK bits is released from the retry buffer and the method ends for the current TLP. If, in step 250, a NAK is received or a timeout occurs the method proceeds to step 205, essentially generating a replay request. A replay is a second or subsequent transmission of a previously sent TLP. While, according to the present invention, the first or initial transmission of a TLP may be direct from the data link layer or through the retry buffer, all replay requests are via the retry buffer.

Note the path including connector A forces all instances of a TLP to be parity/ECC checked including the initial transmission and subsequent replays, while the path including connector B excludes the initial instance of a TLP from being parity/ECC checked, but all replay instances are parity/ECC checked.

When the PCI Express link is brought goes down the retry buffer is cleared. Any TLPs stored in the retry buffer are lost.

Thus, the present invention provides a method and PCI compliant architecture to prevent corrupt data propagation from a PCI Express retry buffer.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
    generating a transaction layer packet in a transmitting component;
    storing said transaction layer packet in one or more sections in a retry buffer of said transmitting component;
    generating one or more check bits for each section of said transaction layer packet and storing said one or more check bits for each section of said transaction layer packet in said retry buffer;
    transmitting said transaction layer packet from said transmitting component to a receiving component; and
    upon a replay request for said transaction layer packet, in sequence from a first to a last section of said transaction layer packet:
        generating a copy of each section of said transaction layer packet stored in said retry buffer;
        generating one or more check bits for each copy of each section of said transaction layer packet; and
        comparing said one or more check bits for each copy of each section of said transaction layer packet with corresponding one or more check bits stored in said retry buffer for each section of said transaction layer packet; and
        if said one or more check bits for a copy of a particular section of said transaction layer packet match said corresponding one or more check bits stored in said retry buffer for said particular section of said transaction layer packet then transmitting said copy of said particular section of said transaction layer packet to said receiving component and if said one or more check bits for said copy of said particular section of said transaction layer packet do not match said corresponding one or more check bits for said particular section of said transaction layer packet then disabling said transmitting component to prevent said copy of said particular section transaction layer packet from being transmitted to said receiving component.

2. The method of claim 1, wherein said replay request is initiated by a reply received by said transmitting component from said receiving component in response to receipt of any particular section of said transaction layer packet or to receipt of any copy of any particular section of said transaction layer packet.

3. The method of claim 1, wherein said replay request is initiated by said transmitting component not receiving a reply from said receiving component in response to in response to receipt of any particular section of said transaction layer packet or to receipt of any copy of any particular section of said transaction layer packet within a preset duration of time.

4. The method of claim 1, wherein said one or more check bits for each section of said transaction layer packet comprise single parity bits and said one or more check bits for said copy of said particular section of said transaction layer packet comprise single parity bits.

5. The method of claim 1, wherein said one or more check bits for each section of said transaction layer packet comprise two or more error check and correction bits and said one or more check bits for said copy of said particular section of said transaction layer packet comprise two or more error check and correction bits.

6. The method of claim 1, wherein said transmitting component and said receiving component are PCI Express compliant components and said transaction layer packet is a PCI Express compliant transaction layer packet.

7. A method, comprising:
generating a transaction layer packet in a transmitting component;
storing said transaction layer packet in one or more sections in a retry buffer of said transmitting component;
generating one or more check bits for each section of said transaction layer packet and storing said one or more check bits for each section of said transaction layer packet in said retry buffer;
in sequence from a first to a last section of said transaction layer packet:
generating a first copy of each section of said transaction layer packet stored in said retry buffer;
generating one or more check bits for each first copy of each section of said transaction layer packet;
comparing said one or more check bits for each first copy of each section of said transaction layer packet with corresponding one or more check bits stored in said retry buffer for a corresponding section of said transaction layer packet; and
if said one or more check bits for said first copy of a particular section of said transaction layer packet match said corresponding one or more check bits stored in said retry buffer for said particular section of said transaction layer packet then transmitting said first copy of said particular section of said transaction layer packet to said receiving component and if said one or more check bits for said first copy of said particular section of said transaction layer packet do not match said corresponding one or more check bits for said particular section of said transaction layer packet then disabling said transmitting component to prevent said first copy of said particular section of said transaction layer packet from being transmitted to said receiving component; and
upon a replay request for said transaction layer packet, in sequence from a first to a last section of said transaction layer packet:
generating a second copy of each section of said transaction layer packet stored in said retry buffer;
generating one or more check bits for each second copy of each section of said transaction layer packet;
comparing said one or more check bits for each second copy of each section of said transaction layer packet with corresponding one or more check bits stored in said retry buffer for a corresponding section of said transaction layer packet; and
if said one or more check bits for said second copy of a particular section of said transaction layer packet match said corresponding one or more check bits stored in said retry buffer for said particular section of said transaction layer packet then transmitting said second copy of said particular section of said transaction layer packet to said receiving component and if said one or more check bits for said second copy of said particular section of said transaction layer packet do not match said corresponding one or more check bits for said particular section of said transaction layer packet then disabling said transmitting component to prevent said second copy of said particular section transaction layer packet from being transmitted to said receiving component.

8. The method of claim 7, wherein said replay request is initiated by a reply received by said transmitting component from said receiving component in response to receipt of any particular section of said transaction layer packet or to receipt of any copy of any particular section of said transaction layer packet.

9. The method of claim 7, wherein said replay request is initiated by said transmitting component not receiving a reply from said receiving component in response to receipt of any particular section of said transaction layer packet or to receipt of any copy of any particular section of said transaction layer packet within a preset duration of time.

10. The method of claim 7, wherein one or more check bits for each section of said transaction layer packet comprise single parity bits and said one or more check bits for said first and second copies of said particular section of said transaction layer packet comprise single parity bits.

11. The method of claim 7, wherein one or more check bits for each section of said transaction layer packet comprise two or more error check and correction bits and said one or more check bits for said first and second copies of said particular section of said transaction layer packet comprise two or more error check and correction bits.

12. The method of claim 7, wherein said transmitting component and said receiving component are PCI Express compliant components and said transaction layer packet is a PCI Express compliant transaction layer packet.

13. A method, comprising:
generating a transaction layer packet in a transaction layer of a PCI Express compliant transmitting component, said transmitting component including a data link layer connected between said transaction layer and a physical layer and further including a retry buffer connected to both said transaction layer and said data link layer, said transaction layer passing said transaction layer packet to said data link layer;
said data link layer storing said transaction layer packet in one or more sections in said retry buffer and said data link layer generating one or more check bits for each section of said transaction layer packet and storing said one or more check bits for each section of said transaction layer packet in said retry buffer;
passing said transaction layer packet from said data link layer to said physical layer of said transmitting component;
transmitting said transaction layer packet from said physical layer of said transmitting component to a physical layer of a PCI Express compliant receiving component over a PCI Express compliant link; and
upon a replay request for said transaction layer packet in sequence from a first to a last section of said transaction layer packet and in said data link layer:
generating a copy of each section of said transaction layer packet stored in said retry buffer;
generating one or more check bits for each copy of each section of said transaction layer packet, comparing said one or more check bits for each copy of each section of said transaction layer packet with corresponding one or more check bits stored in said retry buffer for each section of said transaction layer packet, and passing each copy of each section of said transaction layer packet to said physical layer of said transmitting component; and
if said one or more check bits for a copy of a particular section of said transaction layer packet match said corresponding one or more check bits stored in said retry buffer for said particular section of said transaction layer packet then transmitting said copy of said particular section of said transaction layer packet from said physical layer of said transmitting component to said physical layer of said receiving component over said PCI Express link and if said one or more check bits for said copy of said particular section of said transaction layer packet do not match said corresponding one or more check bits for said particular section of said transaction layer packet then disabling a transmitting capability of said physical layer of said transmitting component to prevent said copy of said particular section transaction layer packet from being transmitted to said physical layer of said receiving component.

14. The method of claim 13, wherein said disabling said transmitting capability of said physical layer of said transmitting component comprises changing a power state of said physical layer of said transmitting component from an operational state to a lower power state.

15. The method of claim 13, wherein said disabling said transmitting capability of said physical layer of said transmitting component comprises directing said physical layer of said transmitting layer to an electrical idle state.

16. The method of claim 13, wherein said replay request is initiated by a reply received by said transmitting component from said receiving component in response to receipt of any particular section of said transaction layer packet or to receipt of any copy of any particular section of said transaction layer packet or wherein said replay request is initiated by said transmitting component not receiving a reply from said receiving component in response to receipt of any particular section of said transaction layer packet or to receipt of any copy of any particular section of said transaction layer packet within a preset duration of time.

17. The method of claim 13, wherein one or more check bits for each section of said transaction layer packet comprise single parity bits and said one or more check bits for said copy of said particular section of said transaction layer packet comprise single parity bits or wherein one or more check bits for each section of said transaction layer packet comprise two or more error check and correction bits and said one or more check bits for said copy of said particular section of said transaction layer packet comprise two or more error check and correction bits.

18. A method, comprising:
generating a transaction layer packet in a transaction layer of a PCI Express transmitting component, said transmitting component comprised of said transaction layer, a data link layer, a physical layer and a retry buffer, said data link layer connected between said transaction layer and said physical layer and said retry buffer connected to said data link layer, said transaction layer storing said transaction layer packet in one or more sections in said retry buffer and generating one or more check bits for each section of said transaction layer packet and storing said one or more check bits for each section of said transaction layer packet in said retry buffer;
in sequence from a first to a last section of said transaction layer packet and in said data link layer:
generating a first copy of each section of said transaction layer packet stored in said retry buffer;
generating one or more check bits for each first copy of each section of said transaction layer packet;
comparing said one or more check bits for each first copy of each section of said transaction layer packet with corresponding one or more check bits stored in said retry buffer for a corresponding section of said transaction layer packet and passing each first copy of each section of transaction layer packet to said physical layer of said transmitting component; and if said one or more check bits for a particular section of said first copy of transaction layer packet match said corresponding one or more check bits stored in said retry buffer for said particular section of said transaction layer packet then transmitting said first copy of said particular section of said transaction layer packet from said physical layer of said transmitting component to a physical layer of a receiving component and if said one or more check bits for said first copy of said particular section of said transaction layer packet do not match said corresponding one or more check bits for said particular section of said transaction layer packet then disabling said physical layer of said transmitting component to prevent said first copy of said particular section transaction layer packet from being transmitted to from said physical layer of said transmitting component to said physical layer of said receiving component; and
upon a replay request for said transaction layer packet, in sequence from a first to a last section of said transaction layer packet and in said data link layer:
generating a second copy of each section of said transaction layer packet stored in said retry buffer;
generating one or more check bits for each second copy of each section of said transaction layer packet;
comparing said one or more check bits for each second copy of each section of said transaction layer packet with corresponding one or more check bits stored in said retry buffer for a corresponding section of said transaction layer packet and passing each second copy of each section of transaction layer packet to said physical layer of said transmitting component; and
if said one or more check bits for a particular section of said second copy of transaction layer packet match said corresponding one or more check bits stored in said retry buffer for said particular section of said transaction layer packet then transmitting said second copy of said particular section of said transaction layer packet from said physical layer of said transmitting component to a physical layer of a receiving component and if said one or more check bits for said second copy of said particular section of said transaction layer packet do not match said corresponding one or more check bits for said particular section of said transaction layer packet then disabling a transmitting capability of said physical layer of said transmitting component to prevent said second copy of said particular section transaction layer packet from being transmitted from said physical layer of said transmitting component to said physical layer of said receiving component.

19. The method of claim 18, wherein said disabling transmitting capability of said physical layer of said transmitting component comprises changing a power state of said physical layer of said transmitting component from an operational state to a lower power state.

20. The method of claim 18, wherein said disabling transmitting capability of said physical layer of said transmitting component comprises directing said physical layer of said transmitting layer to an electrical idle state.

21. The method of claim 18, wherein said replay request is initiated by a reply received by said transmitting component from said receiving component in response to receipt of any particular section of said transaction layer packet or to receipt of any copy of any particular section of said transaction layer packet or wherein said replay request is initiated by said transmitting component not receiving a reply from said receiving component in response to receipt of any particular section of said transaction layer packet or to receipt of any copy of any particular section of said transaction layer packet within a preset duration of time.

22. The method of claim 18, wherein one or more check bits for each section of said transaction layer packet comprise single parity bits and said one or more check bits for said copy of said particular section of said transaction layer packet comprise single parity bits or wherein one or more check bits for each section of said transaction layer packet comprise two or more error check and correction bits and said one or more check bits for said copy of said particular section of said transaction layer packet comprise two or more error check and correction bits.

23. A PCI Express component, comprising:
a PCI Express compliant transaction layer, a PCI Express compliant data link layer, a PCI Express compliant physical layer, a PCI Express compliant retry buffer, and a parity/error check and correction circuit, said transaction layer connected to said retry buffer by a first transmit bus and to said data link layer by a first receive bus, said data link layer connected to said physical layer by a second transmit bus and a second receive bus, said retry buffer connected to said data link layer by a third transmit bus; said parity/error check and correction circuit coupled to both said retry buffer and said physical layer;
wherein said transaction layer is configured to generate a transaction layer packet and write said transaction layer packet in one or more sections to said retry buffer and to generate a set of one or more check bits for each of said one or more sections of said transaction layer packet and write said sets of one or more check bits to said retry buffer;
wherein said retry buffer is configured to store said one or more transaction layer packet sections and said set of one or more check bits;
wherein said parity/error check and correction circuit is configured to generate a copy of a particular section of said one or more transaction layer sections and a copy of said corresponding set of one or more check bits for said particular section of said one or more transaction layer sections, pass said copy of said particular section of said one or more transaction layer sections to said physical layer, generate a new set of one or more check bits based on said copy of said particular section of said one or more transaction layer sections, compare said copy of said corresponding set of one or more check bits with said new set of one or more check bits and disable a transmission capability of said physical layer if said copy of said corresponding set of one or more check bits does not match said new set of one or more check bits; and
said physical layer connectable to a PCI Express link by a fourth transmit bus and a third receive bus.

24. A PCI Express component, comprising:
a PCI Express compliant transaction layer, a PCI Express compliant data link layer, a PCI Express compliant physical layer, a PCI Express compliant retry buffer, and a parity/error check and correction circuit, said transaction layer connected to said data link layer by a first transmit bus and a first receive bus, said data link layer connected to said physical layer by a second transmit bus and a second receive bus, said retry buffer connected to said data link layer by a third transmit bus and a fourth receive bus; said parity/error check and correction circuit coupled to said retry buffer, said data link layer and said physical layer;
wherein said transaction layer is configured to generate a transaction layer packet and pass said transaction layer packet to said data link layer;
wherein said data link layer is configured to pass said transaction layer packet to said physical layer and to store, in said retry buffer, a copy of said transaction layer packet in one or more sections;
wherein said parity/error check and correction circuit is configured to generate respective sets of one or more check bits for each of said one or more sections and store said sets of one or more check bits in said retry buffer;
wherein said data link layer is configured to read said retry buffer and to pass a copy of each section of said one or more transaction layer packet sections from said retry buffer to said physical layer upon a receiving a replay request;
wherein, said parity/error check and correction circuit is configured to read each set of one or more check bits for each copy of each section of said one or more transaction layer packet section and generate a new respective set of one or more check bits based on said copies of each section of said one or more transaction layer packet sections read from said retry buffer, compare said set of one or more check bits read from said retry buffer with said new set of one or more check bits and disable a transmission capability of said physical layer if any set of said one or more check bits read from said retry buffer does not match a corresponding new set of one or more check bits; and
said physical layer connectable to a PCI Express link by a fourth transmit bus and a fourth receive bus.

* * * * *